May 23, 1933.     K. NOGUCHI     1,910,041
PROCESS OF MANUFACTURING ELECTRIC HEATING ELEMENT
Filed Jan. 3, 1929
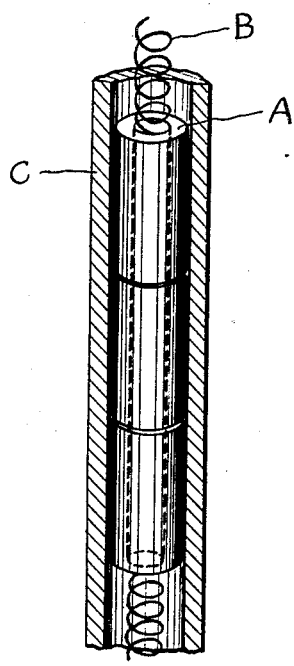
Inventor
K. Noguchi
By  Attorney Patented May 23, 1933

1,910,041

UNITED STATES PATENT OFFICE

KOJYU NOGUCHI, OF YODOBASHI-MACHI, TOYOTAMA-GUN, JAPAN, ASSIGNOR TO MITSUBISHI ZOSEN KABUSHIKI KAISHA, OF TOKYO, JAPAN

PROCESS OF MANUFACTURING ELECTRIC HEATING ELEMENT

Application filed January 3, 1929, Serial No. 329,961, and in Japan August 17, 1928.

This invention relates to a process of manufacturing electric heating elements having a compact filler in a space formed between the tubular shell and electric heating wire inserted in said shell, and consists in a step of manufacturing filler members of desired length having cylindrical or other shape corresponding to the shape of said space from a material such as lime, gypsum, alumina or magnesia or a mixture of aluminum and lime, all of them increasing in volume upon chemical reaction with water, and obtaining refractory and electric insulating properties, a step of pushing said filler members into said space and a step of bringing said filler member therein under chemical reaction with water. The object of the invention is to fill up the space formed between a metallic or other refractory shell and electric heating wire inserted therein with a compact filler of refractory and electric insulating material in a simple and easy manner, and thereby to propose a method of manufacturing a refractory, electric insulating and good heat conductive electric heating element at the smallest expense.

The accompanying drawing illustrates one example of carrying out the invention into practice, the shell being shown in section.

When an electric heating wire is sealed in a slender tubular shell for manufacturing an electric heating element for an electric immersion heater or for similar purposes, it is a difficult operation to fill the shell with a refractory, electric insulating, and good heat conductive filler, and necessitates a complex and troublesome procedure. The present invention has for its object to greatly simplify such operation, so that a good electric heating element can be manufactured in a simple way. According to this invention, filler members of suitable length, preferably short, hollow, tubular members, can be made of any material provided it is refractory, electrically insulating and will increase in volume when acted on by water. For example, quick lime becomes slaked lime by absorbing water and increases in volume. Baked gypsum also increases in volume when it is hardened after being mixed with water. Alumina obtained from Al(OH)$_3$ by drying under 300° C. and magnesia from Mg(OH)$_2$ by drying under 200° C. absorb water very well and increase their volumes. When a mixture of powdered aluminum and powdered slaked lime is acted on by water, there is produced alumina with increased volume. The above materials can be employed as the materials for the filler members of the present invention. For the convenience of explanation, the invention will be fully explained by taking lime as an example of material of the filler member.

If powder of lime is gradually filled up in the tubular shell, into which an electric heating wire has been previously inserted by the so-called tapping-in method and thereafter water is supplied to the lime powder, a moderately compact filler may be obtained. This tapping-in method, however, necessitates skillful labor and moderate time while the compactness of the filler is in most cases insufficient. Therefore, this possesses the drawback of insufficient heat conductivity. According to the present invention, filler members of suitable length having tubular or other shape corresponding to the space formed between the shell and the electric heating wire is first formed by compressing the powdered material into a solid mass by means of a press for instance. The filler member must be of such a size as to minimize the clearances between the shell, the filler member and the electric heating wire, in order to completely fill up the space in the shell. These filler members are then successively inserted into said space so that a desired length of the shell is filled with such filler members as shown in the drawing, in which A are the filler members, B the electric heating wire and C the tubular shell. Then the whole unit is immersed into water so that the filler members are fully acted on by water. Here the filler members become slaked lime and increase in volume so that they tightly contact with the inner wall of the shell while they tightly envelop the electric heating wire thus forming a good heat conductive, compact filler.

When said filler member A is expanded under the chemical reaction with water, it may be expected that the member will be expanded only outwards as may be seen in the expansion of hollow bodies in general. But in this case, when the filler member A is expanded in the limited space of the shell C, the filler member is checked by the inner wall of the shell in course of its expansion and therefore not only is it compressed into a compact and hard filler, but its wall also is expanded inwardly so that the diameter of the central aperture is somewhat contracted. This is a difference of expansion phenomena between a brittle filler member made of compressed powdery material and a strong and ductile body made of iron or other metals. According to my experiments, the degree of said inward swelling of the new filler member is small and of such an extent that, when the electric heating wire is a coiled wire, the coil is just buried in the mass of the filler member, and not intruding further into the hole of the coil. Therefore the filler member inside of the coil is in most cases left hollow. As heat conductivity has no relation to the inside of the coil, it is not affected by the presence of such a central hole of the coil. Moreover, to keep the central hole of the coil open, will afford a good water passage and therefore water reaction is fully and rapidly carried out.

When the above operations are finished, the whole is dried by evaporating water. If desired, the central hole of the coil may be stuffed with lime, alumina, magnesia and similar refractory powder by the tapping-in method or by other convenient method. This will help to prolong the life of the heating element as it will protect the inside of the wire from being oxidized by excluding the air. Such inside filler does not necessarily have to be compact because its purpose is not heat conduction, but for protection against oxidation as above explained.

So far the invention is explained with reference to an example in which the filler member is formed by one cylindrical or tubular body. Of course, there may be cases in which it is convenient to employ two halves composing one filler member according to the shape of the shell and the heating wire. Also, not only tubular filler members, but also any suitable form of the filler members may be adapted to conform with the shape of the shell and the heating wire. The method may also be modified within the scope of the invention in such a way that the heating wire is previously buried in the filler powder and pressed together in one body and then inserted into the shell.

What I claim is:

1. A process of manufacturing electric heating elements having a compact filler member surrounding an electric heating wire within the cavity of a tubular shell, said process consisting in a first step of manufacturing filler members of suitable length and corresponding in cross section to that of said cavity from a refractory material adapted to increase in volume upon chemical reaction in water and being suitable as electric insulation, said material being selected from a group consisting of lime and gypsum obtained from hydroxide by low temperature drying; a second step of placing said filler members in said cavity and a further step of exposing said filler members to chemical reaction in water for the purpose of expanding the walls thereof.

2. A process of manufacturing electric heating elements as described in claim 1, consisting in a first step of manufacturing a filler member by compressing the filler material around said heating wire to form one unit; a second step of inserting said unit in the cavity of said shell, and a last step of immersing the entire heating element in water, thereby bringing said filler member to chemical reaction with the water for the purpose of expanding the walls thereof.

3. A process of manufacturing electric heating elements having a compact filler member surrounding an electric heating wire within the cavity of a tubular shell, said process consisting in a first step of manufacturing filler members of suitable length and corresponding in cross section to that of said cavity from a refractory material adapted to increase in volume upon chemical reaction in water and being suitable as electric insulation, said material being selected from a group consisting of lime, gypsum, alumina, magnesia and a mixture of powdered aluminum with slaked lime, obtained from hydroxide by low temperature drying; a second step of placing said filler members in said cavity and a further step of exposing said filler members to chemical reaction in water for the purpose of expanding the walls thereof.

4. A process of manufacturing electric heating elements as described in claim 3, consisting in a first step of manufacturing a filler-member by compressing the filler material around said heating wire to form one unit; a second step of inserting said unit in the cavity of said shell, and a last step of immersing the entire heating element in water, thereby bringing said filler member to chemical reaction with the water for the purpose of expanding the walls thereof.

In testimony whereof I affix my signature.

KOJYU NOGUCHI.